May 16, 1967 T. V. WIGINGTON 3,319,853
AUTOMOBILE CLOTHES RACK
Filed Oct. 23, 1965
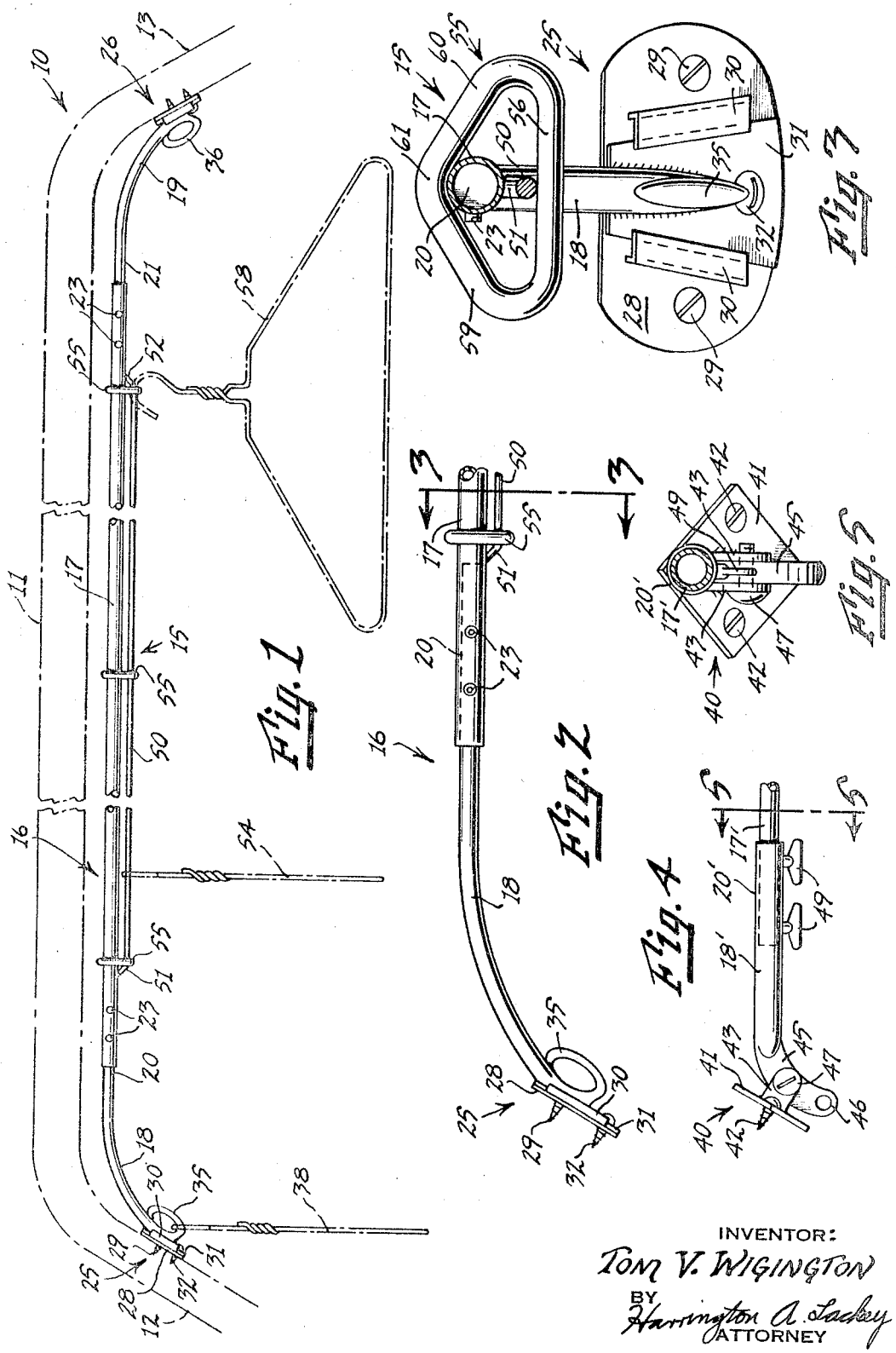
INVENTOR:
Tom V. Wigington
BY
Harrington A. Lackey
ATTORNEY 3,319,853
AUTOMOBILE CLOTHES RACK
Tom Virgil Wigington, Rte. 2,
College Grove, Tenn. 37046
Filed Oct. 23, 1965, Ser. No. 503,230
6 Claims. (Cl. 224—42.1)

This invention relates to an automobile clothes rack, and more particularly to a clothes rack adapted to be mounted in the interior of an automobile for supporting clothes hangers both longitudinally and transversely of the automobile.

Heretofore, automobile clothes racks have ranged from hooks mounted on the side walls or supported over the window glass of the automobile to rods or bars extending either transversely or longitudinally of the interior of the car, primarily over the rear seat area.

It is an object of this invention to provide an automobile clothes rack which is designed for supporting clothes hangers longitudinally of the automobile, and also for supporting clothes hangers transversely of the automobile to permit the longer clothes, which depend below the rear seat, to lie flat against the front of the rear seat without wrinkling.

Another object of this invention is to provide an automobile clothes rack having convenient means for adjusting the length of the rack and for securing the ends of the rack to the sides of the automobile efficiently and quickly.

Another object of this invention is to provide an automobile clothes rack having a minimum of parts, which will occupy a minimum of space for the designed functions of the rack.

A further object of the invention is to provide an automobile rack which is designed for adequate strength to support loaded clothes hangers both longitudinally and transversely of the automobile.

Further objects and advantages of the invention will be apparent from the following description taken in conjunction with the drawings, wherein:

FIG. 1 is a front elevation of the invention in operative position mounted transversely of the interior of an automobile, partially shown in phantom, and supporting clothes hangers, also shown in phantom, in various positions;

FIG. 2 is an enlarged fragmentary front elevation of the right end portion of the automobile clothes rack disclosed in FIG. 1;

FIG. 3 is an enlarged section taken along the line 3—3 of FIG. 2;

FIG. 4 is an enlarged fragmentary front elevation of a modified form of the right end portion of an automobile clothes rack made in accordance with this invention; and FIG. 5 is an enlarged section taken along the line 5—5 of FIG. 4.

Referring now to the drawings in more detail, FIG. 1 discloses fragmentarily and in phantom the cross-section of an automobile body 10 having a roof 11, a right side wall 12 and a left side wall 13.

The automobile clothes rack 15 made in accordance with this invention includes an elongated support rod member 16 having a main rod or section 17, a right end rod or section 18 and a left end rod or section 19. The main rod 17 is a straight, hollow, cylindrical tube. Each end rod 18 and 19 is arched and has cylindrical inner or inboard end portions 20 and 21, respectively, whose diameters are substantially equal to or slightly less than the inner diameter of the main rod 17. Thus, the inner end portions 20 and 21 may be telescopingly received within the opposite ends of the main rod 17, as disclosed in FIGS. 1 and 2, and held in telescoped position by means, such as Allen screws 23. In this manner, the elongated support rod member 16 may be longitudinally adjusted to fit various transverse widths of different automobile bodies 10.

The outer or outboards ends of the end rods 18 and 19 comprise end attachments 25 and 26, respectively, for securing the rack 15 to the side walls 12 and 13. As best disclosed in FIGS. 2 and 3, the right end attachment 25 includes a plate bracket 28 adapted to fit flush against the side wall 12, and which is secured to the side wall 12 by means of the screws 29. Fixed on the inner face of the plate bracket 28 are a pair of inturned angled flanges 30 converging upwardly to form a dovetail guideway. Adapted to slidably fit within the guideway flanges 30 is a flat, dovetail-shaped tongue 31 of substantially the same shape and of sufficient size to be slidably moved upward between the flanges 30. When the tongue 31 is seated in operative position between the flanges 30, a screw 32 may be inserted through mating aligned holes, not shown, in the tongue 31 and the plate 28 to rigidly secure the end rod 18 to the side wall 12. The end attachment 26 is constructed identically to end attachment 25 for securing the left end rod 19 to the side wall 13.

If desired, hanger loops 35 and 36 may be formed as an integral part of the outer portions of the end rods 18 and 19, respectively, for supporting one or more clothes hangers 38 adjacent the side walls 12 and 13.

An alternative type of end attachment 40 as disclosed in FIGS. 4 and 5, may be substituted for the end attachments 25 and 26, if desired. The end attachment 40 includes a bracket plate 41 having screws 42 for fixing the bracket plate 41 to the side wall, such as 12. The bracket plate 41 has a pair of spaced parallel ears 43 projecting inwardly from the plate 41 with aligned apertures, not shown, extending through both ears 43. The right end rod 18' has an arcuate flat outer end portion 45 adapted to be received between the ears 43. One or more holes 46 are spaced along the arcuate end portion 45 for alignment with the aligned holes, not shown, in the ears 43, for receiving a pin or threaded bolt 47 in various adjusted positions. The inner or inboard end portion 20' of the end rod 18' is shown as a cylindrical tube adapted to telescopingly receive the smaller end of the main rod 17'. The main rod 17' and the end rod 18' are secured together by means of the wing screws 49. Thus, by adjusting the wing screws 49 as well as aligning the proper hole 46 between the ears 43 for receiving the pin 47, the modified form of end attachment 40 may be adapted to fit automobile bodies 10 of various widths.

Referring again to FIGS. 1–3, an elongated hanger rod 50, which may be of smaller diameter than the main rod 17, is fixed parallel to and substantially vertically below the main rod 17 by means of its angular, unturned end portions 51 and 52 welded to the main rod 17. The angular positions of the end portions 51 and 52 provide a truss-like support for not only supporting the weight of the clothes carried by hangers 54 on the hanger rod 50, but also for resisting longitudinal thrust forces on the rod 50 relative to the main rod 17. The elongated hanger rod 50 may be as long as desired, but for practical and obvious reasons is less than the overall length of the support rod member 16. It will be observed, particularly in FIG. 1, that the elongated hanger rod 50 supports a plurality of clothes hangers 54 so that they are disposed transversely of the support member 16, but longitudinally of the automobile body 10.

As disclosed in FIG. 1, a plurality of hanger loop members 55 are mounted on and around and spaced longitudinally of, the main support rod 17. FIG. 3 discloses each loop member 55 as having a substantially triangular shape, including a straight bottom hanger rod 56, which is disposed transverse and normal to the main support rod 17 and hanger rod 50. Thus, as disclosed in FIG. 1, the transverse rod 56, which extends longitudinally of the automobile body 10, may support clothes hangers 58 to lie transversely of the automobile body 10. Each hanger member 55 is preferably formed in a closed loop for strength, and has upturned end portions or legs 59 and 60 converging upwardly and over the main rod 17 in an apex 61. The apex 61 is fixed to, by welding or otherwise, the top of the main rod 17, to better support each hanger loop member 55, and the weight of the clothes carried thereon. The upturned portions 59 and 60 prevent the hanger, or hangers, 58 from sliding longitudinally off the transverse rod 56.

As also disclosed in FIG. 3, the elongated hanger rod 50 of smaller diameter than the main rod 17 may be carried over the transverse rod 56, and welded thereto if desired, in order to lend additional support to the elongated hanger rod 50. Thus, the elongated hanger rod 50 will be braced at spaced intervals in addition to its truss-supports 51 and 52.

The operation of the invention is best disclosed in FIG. 1. The bracket plate 28 of both end attachments 25 and 26 are first fixed at the desired elevation, substantially level with each other, on the opposite side walls 12 and 13 of the automobile body 10. The Allen screws 23 are loosened, and the end rods 18 and 19 are longitudinally adjusted until the tongues 31 may be slidably introduced upwardly within the coresponding guideways 30 of the attachments 25 and 26. The bracket plate 28 should be located so that the main rod 17 may be located very close to the automobile roof 11 when in its final operative position. When the tongues 31 have been completely inserted in the guideways 30, the screws 32 are inserted through the aligned holes, not shown, to securely fix the support rod member 16 in its operative position. The Allen screws 23 are then tightened and the clothes rack 15 is then in operative position with the elongated hanger rod 50 extending transversely of the automobile body beneath the main rod 17, and the transverse rods 56 of the hanger loop members 55 extending longitudinally of the automobile body 10.

In order for the clothes rack 15 to carry out its primary functions, it should be located to extend transversely of the automobile body 10 and extend vertically over the front portion of the rear seat of the automobile. In this position, clothes hangers 58 upon which long clothes, such as overcoats, raincoats, long dresses or gowns are supported, may be hung on the transverse rod 56 so that the clothes will lie flat against the front edge of the rear seat and depend toward the floor, without wrinking. Other clothes of shorter nature, such as coats, shirts and skirts, may be hung on the clothes hangers 54 for suspension from the elongated hanger rod 50, directly above, but without touching, the rear seat. Longer clothes hung on hangers 54 would extend down upon the rear seats where they would be crumpled or wrinkled, or if they passed forwardly over the rear seat, they would be twisted and wrinkled.

Hanger loops 35 and 36 may also be provided for hanging clothes along the side walls 12 and 13 of the car, respectively, if desired.

It will also be observed that the clothes rack 15 may be maintained in a permanent position in the automobile body 10 for as long as desired. However, if for any reason it is desired to move the rack 15 to another car, this may be easily accomplished by loosening the Allen screws 23, depressing the rack 15 until the tongues 31 are removed from the dovetail flanges 30 after the screw 32 is removed, then removing the screws 29 and plate 28, and reversing the procedure to install the rack 15 in the other car. Such an operation is simple and quickly accomplished. The telescoping end portions 20 and 21 permit ready adjustment to automobiles of different widths.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:
1. A clothes rack for the interior of an automobile having opposite side walls comprising:
 (a) an elongated support rod member having opposite ends,
 (b) means for securing said opposite ends to said opposite walls to mount said rod member transversely of the interior of said automobile,
 (c) an elongated hanger rod shorter than said rod member,
 (d) means fixing said elongated hanger rod parallel to and below said rod member,
 (e) a plurality of hanger loop members fixed normal to, depending from, and spaced longitudinally of said rod member,
 (f) each hanger loop member including a straight transverse bottom rod disposed normal to said rod member and adapted to support clothes hangers transversely of said automobile.

2. The invention according to claim 1 in which said end securing means comprises a bracket fixed to each side of said automobile, each bracket having a dovetail guideway converging upwardly, each end of said rod member comprising a dovetail tongue adapted to be received in said guideway, and means for securing each tongue in its corresponding guideway.

3. The invention according to claim 2 in which said rod member comprises a main rod, and said opposite ends comprise end portions telescopingly received in said main rod.

4. The invention according to claim 1 in which said end securing means comprises a bracket fixed on each side wall of said automobile, each bracket having a pair of interiorly directed spaced ears, each end of said rod member comprising a tongue adapted to be received between said ears, and pin means for securing said tongue between said ears.

5. The invention according to claim 1 in which each of said straight transverse bottom rods is fixed to said elongated hanger rod.

6. The invention according to claim 1 in which said means fixing said hanger rod to said rod member comprises opposite end portions of said hanger rod diverging upwardly and fixed to said rod member.

References Cited by the Examiner
UNITED STATES PATENTS 2,714,965  8/1955  Fitzkee et al. _____ 211—113
2,777,624  1/1957  Nelson _____ 224—42.1

References Cited by the Applicant
UNITED STATES PATENTS 1,966,283  7/1934  Brody.
2,472,132  6/1949  Walker.
2,478,337  8/1949  Strasser et al.
2,517,072  8/1950  Zimmer.
2,543,202  2/1951  Robinson.
2,699,873  1/1955  Brady.

GERALD M. FORLENZA, *Primary Examiner.*

F. E. WERNER, *Assistant Examiner.*